July 14, 1964     R. H. McCORMICK ETAL     3,140,924
LIQUID-LIQUID EXTRACTION TOWER CONTAINING INDIVIDUAL STAGES
Filed Dec. 1, 1959     2 Sheets-Sheet 1
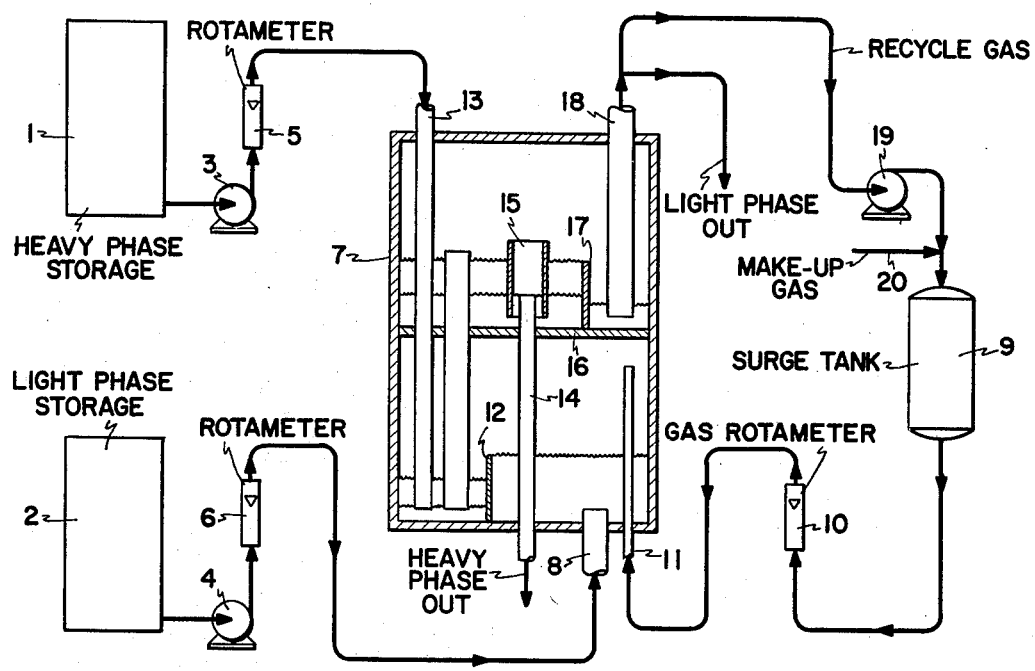
FIGURE I
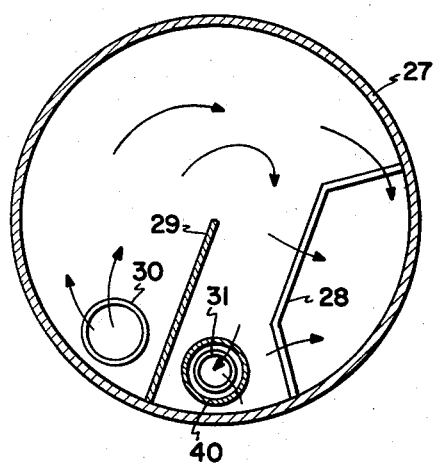
FIGURE III
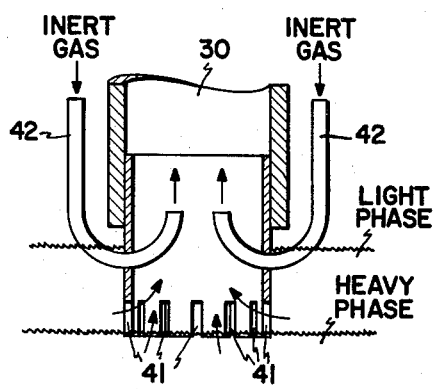
FIGURE IV
Robert H. McCormick
Harry Lawroski    Inventors
Small, Thomas, Dunham & Marx
By   Byron O. Dimmick    Attorney

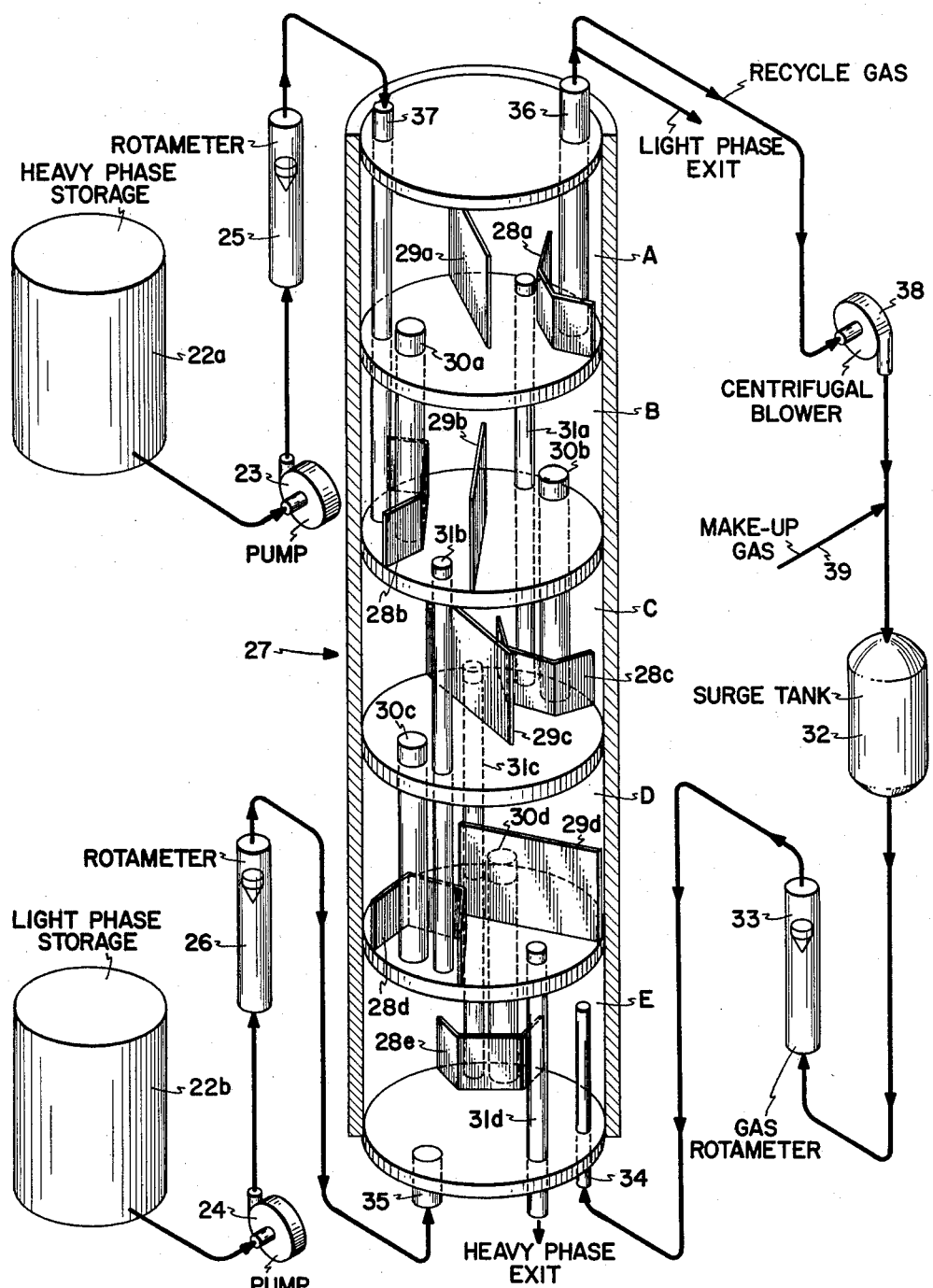
FIGURE II

United States Patent Office 3,140,924
Patented July 14, 1964

3,140,924
LIQUID-LIQUID EXTRACTION TOWER
CONTAINING INDIVIDUAL STAGES
Robert H. McCormick and Harry Lawroski, State College,
Pa., assignors to Esso Research and Engineering Company, a corporation of Delaware
Filed Dec. 1, 1959, Ser. No. 856,478
16 Claims. (Cl. 23—310)

This invention relates to a new and improved apparatus and method for liquid-liquid extraction.

More specifically, the instant invention teaches a method and apparatus for a mixer-settler liquid-liquid extractor incorporating gas mixing. One of the main obstacles to large-scale development of efficient liquid extraction is the lack of an efficient high capacity extractor. The production of good yields of high quality products necessitates the use of compound extraction processes, i.e. an enriching and stripping section in the extractor. A well designed extractor must have the following characteristics: (1) efficient contacting of the liquid phases, (2) ample settling of the liquid phases, (3) proper solubility control of the extraction process, and (4) a high capacity. The present extractor excels in these characteristics.

Liquid-liquid extraction operations of this general type occur very widely in chemical processes. They are very frequently used in the refining of oils, as for instance, in contacting petroleum distillates with selective solvents, with sulfuric acid, or with alkaline solutions, in the solvent extraction of hydrocarbon mixtures, including naphthas and lubricating oils, products from coal carbonization, synthetic fuels and lubricants, and the separation of chemical mixtures by virtue of differences in solubility of the components of the mixture.

The apparatus of the present invention comprises broadly a series of vertically disposed vessels in which the mixing of a relatively light and relatively heavy phase is brought about by a gas or vapor phase. Each stage contains a mixing zone, settling zone, and a phase separating zone. The two phases flow concurrently through the stages, but countercurrently between the stages. Referring to a particular or given stage, the heavy phase and light phase material enter a contacting area wherein they flow up through a mixing zone or tube accompanied by a gas phase. Upon exit from the mixing zone the mixed phases enter the settling zone of the next uppermost vessel. The mixed phases then pass around an obstruction or baffle while gradually settling to form two distinct phases, at a point in the vessel furthest from the exit of aforementioned mixing zone separation takes place. The light phase flows over a weir into the contacting area of the following stage, while the heavy phase flows downward to the contacting area of a stage at least two beneath. The light phase which passes over the weir into the contacting area last named is again brought into contact with the heavy phase which descends from a vessel at least two stages above. At this point the light and heavy phase are again forced through the mixing zone and intimately contacted. The ends of the apparatus are provided with lines to permit the entrance and withdrawal of the phases. For example, at the uppermost end of the apparatus the heavy phase liquid is introduced and the light phase withdrawn. At the lowermost end of the apparatus the light phase liquid is introduced and the heavy phase liquid withdrawn. The gaseous phase proceeds through the system concurrently with the light phase. Of course, the various phases may be introduced or withdrawn at intermediate stages. The art and technology of utilizing reflux in liquid-liquid extraction processes is now well established and known. The contacting area is the point wherein the relatively light phase and relatively heavy phase may come together for subsequent mixing in the mixing zone. This area is at least in part bonded by the weir over which the light phase flows.

The instant invention has several features which are a great improvement over previous modes of extraction. The mixing zone is vertically disposed and has a diameter much smaller than the settling zone. The length of this former zone is several times the height of the settling zone. The length of the mixing zone permits the long period of contact time which is required for thorough mixing, and furthermore, the small diameter of the zone assures the avoidance of by-passing, channelling, or non-mixing of the two liquid phases. It will be noted that the height of the total multi-stage extractor approximately equals the lengths of the total mixing zone. These are important features which distinguish prior liquid-liquid contacting devices which have mixing zones of large area and considerably shorter length. The settling operation occurs in a zone where the area is quite large and the liquid depths shallow in comparison with their cross section. This permits time for settling as the mixed phases flow through the settling zone. A baffle may be used to lengthen the time of flow through the settling zone. The shallow character of these settling zones expedites rapid settling because the droplets or dispersed phases do not have to travel great distances (due to free fall or buoyancy) before they meet their respective clear zones of settled phase, free from entrainment. The use of a substantial amount of gas phase in the settling zone of the extractor is beneficial because it cuts down on the inventory of liquid in the extractor. This also permits relatively shallow settling zones to be utilized, and it provides gas-liquid interfaces at the points where the settled phases leave the settling zone to go to their next respective mixing zones. This gas-liquid interface cuts down, or eliminates, the entrainment of the one liquid phase in the other.

Another feature of the invention is the efficient use of the gas in providing mixing. Substantially all of the energy expended in driving the gas through the extractor serves to enhance the contact of the two phases in the mixing zone. In previous equipment using gas, the gas was required not only for mixing, but also in a separate and distinct part of the apparatus to convey one phase from one stage to the next against the force of gravity. This results in an additional pressure drop through the system and a corresponding requirement of more energy. The phases in the instant invention, once they exit from the mixing tube, flow to their next respective stages without the need of additional energy, i.e. the light phase simply flows over a weir and the heavy phase flows through a downcomer to at least two stages beneath.

Flowing the relatively heavy phase, upon separation, to a stage at least two stages beneath is a novel and important part of the invention. This feature permits the maintenance of cocurrent flow in the individual stages and an overall countercurrent flow through the extractor. While at the same time it permits the incorporation of a long vertical mixing tube, which, as mentioned previously, is of high efficiency.

To minimize frictional or energy losses in the extractor, there is no back mixing or cycling of any of the phases. At the end of the mixing zone the two liquid phases and the gas phase leave cocurrently issuing as a jet. The two liquid phases drop by gravity through the gas into the settling zone. They are well mixed but not emulsified making their separation easy. The two liquid phases need not exist as an emulsion to be transported or transferred to the settling zone upon leaving the mixing zone.

The prior art teaches many methods and apparatus for liquid-liquid extraction. However, these units result in low efficiency primarily because the contacting time of the two liquid phases is comparatively short or, on the other hand, the mixing zone is not sufficiently confined to force the intimate contact of the two phases. Another cause of inefficiency is the inadequate settling of the two phases prior to separation. Obviously, as the two phases are still to some extent "mixed," an effective separation cannot be realized.

In order to determine the efficiency of the apparatus, it is necessary to devise or select a method of calculation which provides consistent and comparable results for the system being studied. If the mixing section is considered as a separate unit the process is a steady state cocurrent one in which a single compound is transferred from one phase to another. The two liquid phases are essentially insoluble in each other and one or both may contain a low concentration of a solute. This cocurrent process produces as its ultimate products two effluent streams in equilibrium and is considered as a single stage process. The approach to equilibrium attained in an actual stage is the stage efficiency, which may be expressed in a number of ways. Among these are Murphree stage efficiency and material balance efficiency. For reasons that will not be elaborated herein, this latter efficiency is used in the data supplied hereto.

The material balance efficiency may be defined by the equation.

$$\text{Material balance efficiency} = \frac{Y_{1A} - Y_A}{Y_A' - Y_A}$$

where:

$Y_{1A}$=concentration of solute in leaving solvent stream.
$Y_A$=concentration of solute in entering solvent stream.
$Y_A'$=equilibrium concentration which would result in solvent phase if complete mixing results.

For a more complete understanding of the invention, reference may be had to the accompanying drawings:

FIGURE I is a schematic diagram of a single-stage, gas mixing liquid-liquid extraction unit.

FIGURE II is a schematic diagram in perspective of a four-stage gas mixing liquid-liquid extraction unit.

FIGURE III shows the construction and phase flow for an individual stage in the four-stage gas mixing liquid extractor as viewed from above.

FIGURE IV illustrates a preferred construction of a gas distributor for the liquid-liquid extractor unit.

Turning to FIGURE I, heavy and light phase mixtures are pumped from storage tanks 1 and 2, respectively, through pumps 3 and 4, respectively, and rotometers 5 and 6, respectively, into the single stage extraction unit 7. The light phase enters unit 7 through intake tube 8. An inert gas such as air from surge tank 9 passes through the gas rotometer 10 through pipe 11 into unit 7. The heavy phase enters unit 7 through downcomer pipe 13 and exits into the bottom portion of said unit 7. The level of the light phase is controlled by weir 12. The light phase that overflows the weir 12 is mixed with the heavy phase in mixer tube 21. The mixture of light and heavy phase is forced up and further mixed in the mixer tube 21 by the inert gas. The mixture of light and heavy phase and inert gas exits from the mixer tube in the upper portion of unit 7. In the upper portion of unit 7 the light and heavy phases are permitted to settle and separate. The heavy phase exits from the upper portion of the unit 7 through downcomer pipe 14. Downcomer pipe 14 is equipped with a trap 15 which is held slightly above the plate 16 which separates the upper and lower portions of unit 7. The trap 15 is simply a cylinder fitted over the heavy phase downcomer 14 and permits only the heavy phase to enter said downcomer 14. The top of trap 15 is extended above the level of the light phase to prevent any bypassing of the light phase; it is also open at the top to prevent siphoning of the heavy phase. The separated light phase passes over the weir 17 and is forced through the exit tube 18 by the inert gas. The inert gas also exits through tube 18 and may be separated from the light phase or released to the atmosphere. It is preferred, however, to recycle this gas through gas blower 19 and back to surge tank 9. Any makeup gas needed may be supplied through line 20.

Turning now to FIGURE II showing the four-stage extraction unit, the operation in the unit is essentially a compounding of the single-stage operation. Of course, in practice it is most likely that a multistage, rather than a one-stage unit would be used. In the four-stage unit the heavy and the light phases are stored in tanks 22a and 22b, respectively passed by means of pumps 23 and 24 through rotometers 25 and 26, respectively. Upon leaving the rotometers the phases pass into the extraction unit 27. The extraction unit 27 is made up of five chambers, A, B, C, D, and E, the first four representing the four stages of the extractor. Within the chambers there are weirs 28–a, 28–b, 28–c, 28–d and 28–e, the small letters corresponding to the chamber wherein the weir is located. Chambers A, B, C, and D are equipped with baffles 29–a, 29–b, 29–c, and 29–d respectively. The mixing tubes are represented by the numerals 30–a, 30–b, 30–c, and 30–d, the small letters corresponding to the compartments at which the respective mixing tube exits. The traps are not indicated in FIGURE II for the sake of simplicity; they are, however, used in each stage and function in the same manner as described in the single-stage unit. Numerals 31–a, 31–b, 31–c, and 31–d indicate the heavy phase downcomper pipe. In this case the small letters represent the compartments from the heavy phase is withdrawn. An inert gas from surge tank 32 passes through gas rotometer 33 into chamber E of unit 27 through tube 34, while the light phase enters unit E through intake tube 35. The latter phase flows over the weir and comes into contact with the heavy phase from chamber C, this phase being transmitted to chamber E through downcomer pipe 31–c. The two phases flow up through mixer tube 30–d accompanied by the inert gas. The three components, i.e. the heavy and light phases and the inert gas, then enter chamber D wherein the two liquid phases are permitted to settle. Upon settling the light phase flows over weir 28–d and is brought into contact with heavy phase from chamber B via downcomer pipe 31–b. The settled heavy phase from chamber D flows under a trap (not shown) through the downcomer pipe 31–d, and exits from units 27. In a manner analogous to that described above, the light phase in chamber D and the heavy phase from downcomer 31–b are forced up through mixer tube 30–c. This mixer tube exits into chamber C. This process is continued until the light phase flows over the weir 28–a in chamber A. At this point the slight phase, along with the inert gas, is removed from extraction unit 27 through exit tube 36. The heavy phase enters the extraction unit 27 through downcomer pipe 37 and is brought into contact with the light phase in chamber B. The two phases are mixed in mixer tube 30–a and forced to chamber A along with the inert gas and so on the progress continues. The inert gas is separated from the exit liquid phase and recycled by means of a centrifugal blower 38 and back to surge tank 32. Makeup gas may be added through line 39.

The overall flow pattern is the passing of light phase and gas from stage to stage consecutively upward, while the heavy phase drops two stages and then up one through the mixer tubes to result in a downward pattern of consecutive stages. The end result is a cocurrent/countercurrent liquid extraction. The effluent from the mixer tubes 30–a, 30–b, 30–c, 30–d is forced to flow around the baffles 29–a, 29–b, 29c, 29–d, respectively. This permits the effluent mixture to settle into distinct phases before flowing over the weir or down through the downcomer pipe.

FIGURE III clearly shows the phase flow and constrution of an individual stage as seen from the top. The two liquid and gas phases rise up to the stage through mixing tube 30. The two liquid phases move around the baffle 29 and settle into distinct phases. The light phase flows over the weir 28 and the heavy phase flows under trap 40 and down through downcomer pipe 31. The arrows indicate the direction of flow.

The distributor shown in FIGURE IV is designed to have a continuous flow of the gas, and both the light and heavy liquid phases into the mixer tube. The gas flows continuously into the mixer tube (30) from the chamber (A, B, C, D, and E) through tubes (42) whose inlet ends are mounted several inches above the liquid level in the chamber. Without these tubes the gas enters the mixer tube through holes located in the sides and at the bottom of the mixer tube. This causes an intermittent or surging flow of gas because of level changes in the liquid, due principally to the pressure drop of the gas and liquid phases flowing through the mixer tube.

The bottom of the mixer tube is so positioned with respect to the phase levels that the light phase enters through the slotted portion (41) while the heavy phase enters the bottom end of the mixer tube. In this way provision is made for continuous flow of both phases, rather than a possible intermittent flow of the individual phases.

EXAMPLE 1

In order to show the efficiency of the single-stage unit for a typical hydrocarbon mixture and using a typical solvent, runs were made on the system of normal heptane-methylcyclohexane-aniline. These runs were made at total liquid flow rates from 0.5 to 1.0 gallon per minute, using an aniline to hydrocarbon volume ratio 1:1. The gas rate employed varied from 0.05 to 0.5 cubic foot per minute which corresponds to a gas-to-liquid ratio 7.5:1 to 0.3:1. The inert gas in all the examples was air.

The mixture tubes employed in these single-stage tests are as follows:

(1) Mixer tube A, which was 14 inches in length and contained five packed sections, each consisting of one 14-mesh copper screen in the form of a hemisphere. The spacing between sections of packing was 2.5 inches except for the last section which was 1.75 inches.
(2) Mixer tube B, which was 14 inches in length and contained one 14-mesh copper screen placed in the center of the tube or 7 inches from each end.
(3) Mixer tube C, which was 14 inches in length and contained no packing.
(4) Mixer tube D, which was 7 inches in length and contained no packing.

These mixer tubes all had an inside diameter of 1 inch.

The data for these single-stage runs are presented in Table 1.

*Table 1.—Efficiency Data for Single-Stage Unit Using n-Heptane:Methylcyclohexane:Aniline System*

| Run No. | Total Liquid Rate, gals. per minute | Gas Rate, cu. ft. per. min | MCH Content, vol. percent Leaving in— | | Efficiency, percent | Mixer Tube Used [1] |
|---|---|---|---|---|---|---|
| | | | Extract | Raff. | | |
| 1 | 0.5 | 0.5 | 67.1 | 56.7 | 95–100 | A |
| 2 | 0.76 | 0.5 | 66.8 | 56.7 | 95–100 | A |
| 3 | 1.0 | 0.5 | 65.3 | 55.3 | 95–100 | A |
| 4 | 0.5 | 0.5 | 65.3 | 55.3 | 95–100 | A |
| 5 | 0.5 | 0.5 | 70.4 | 62.2 | 95–100 | A |
| 6 | 1.0 | 0.5 | 69.9 | 62.2 | 95–100 | A |
| 7 | 1.0 | 0.4 | 67.1 | 59.3 | 95–100 | A |
| 8 | 1.0 | 0.2 | 67.1 | 59.3 | 95–100 | A |
| 9 | 1.0 | 0.2 | 66.8 | 58.7 | 95–100 | A |
| 10 | 1.0 | 0.5 | 65.6 | 57.0 | 95–100 | B |
| 11 | 1.0 | 0.2 | 65.6 | 57.0 | 95–100 | B |
| 12 | 1.0 | 0.11 | 63.3 | 55.3 | 95–100 | B |
| 13 | 1.0 | 0.2 | 63.9 | 55.0 | 95–100 | C |
| 14 | 1.0 | 0.14 | 63.9 | 55.0 | 95–100 | C |
| 15 | 1.0 | 0.08 | 63.3 | 55.0 | 95–100 | C |
| 16 | 1.0 | 0.08 | 62.9 | 54.5 | 95–100 | D |
| 17 | 1.0 | 0.20 | 62.9 | 54.5 | 95–100 | D |
| 18 | 1.0 | 0.05 | 60.7 | 52.6 | 95–100 | D |
| 19 | 1.25 | 0.05 | 59.4 | 51.6 | 90–95 | D |

[1] Described in text.

It will be noted that the single-stage unit showed excellent efficiency data. In all the runs with the exception of Run 19 efficiencies were between 95 and 100%. Run 19 shows, however, that even with flow rates as high as 1.25 gallons per minute excellent results are obtained.

EXAMPLE 2

In order to test the efficiency of the four-stage unit, a water:kerosene:methyl ethyl ketone system was used. Runs were made at total liquid flow rates varying from 0.51 to 1.26 gallons per minute using a kerosene to water volume ratio of 2:1. The gas rate employed was 0.5 cubic ft. per minute which corresponds to a gas to liquid ratio of 7.35 and 2.97, respectively.

The mixer tubes utilized in the four-stage extraction unit are as follows:

(1) Mixer tube A which contained five packed sections, each consisting of one 14-mesh copper screen in the form of a hemisphere. The spacing between sections of packing was 2.5 inches except for the last section which was at 1.75 inches.
(2) Mixer tube C which contained no packing.
(3) Mixer tube E which contained five packed sections, each consisting of one 14-mesh horizontal screen. Spacing between packed sections was 2.25 inches.

All mixer tubes tested were 14 inches in length and one inch inside diameter.

The length of time required for attaining equilibrium conditions in the four-stage extraction unit was established by procuring and analyzing samples from individual stages at five minute intervals during the runs. From these runs it was established that equilibrium conditions were reached in five to ten minutes after a steady flow of both light and heavy phase was obtained at the respective ends of the unit. The data for these runs are presented in Table 2.

*Table 2.—Efficiency Data for Four-Stage Unit While Extracting Methylethylketone From Water With Kerosene*

[Temperature of runs=77° F.; volume ratio, kerosene:water =2:1; gas rate (cu. ft./min.) =.5]

| Run No. | Total Liquid Rate, Gallons per Minute | Stage No. | MEK Concentration Leaving in— | | Eff., percent | Mixer Tube Tested |
|---|---|---|---|---|---|---|
| | | | Water, wt. percent | Kerosene, wt. percent | | |
| 1 | 0.76 | 4 | 8.5 | 6.0 | 66 | E |
| | | 3 | 6.5 | 4.0 | 57 | |
| | | 2 | 4.9 | 2.8 | 68 | |
| | | 1 | 3.7 | 1.5 | 59 | |
| | | Entering Streams | 11.9 | 0.5 | [1] 62 | |
| 2 | 0.76 | 4 | 8.5 | 5.9 | 67 | E |
| | | 3 | 6.5 | 3.8 | 57 | |
| | | 2 | 5.0 | 2.6 | 54 | |
| | | 1 | 3.7 | 1.5 | 59 | |
| | | Entering Streams | 12.2 | 0.6 | [1] 59 | |
| 3 | 0.76 | 4 | 11.1 | 9.2 | 73 | E |
| | | 3 | 8.1 | 5.6 | 64 | |
| | | 2 | 6.2 | 3.6 | 56 | |
| | | 1 | 5.2 | 2.8 | 60 | |
| | | Entering Streams | 17.0 | 1.9 | [1] 63 | |
| 4 | 1.26 | 4 | 9.6 | 5.9 | 52 | E |
| | | 3 | 8.1 | 4.0 | 40 | |
| | | 2 | 6.5 | 2.8 | 46 | |
| | | 1 | 5.6 | 1.9 | 29 | |
| | | Entering Streams | 12.4 | 1.3 | [1] 42 | |
| 5 | 0.51 | 4 | 8.4 | 6.3 | 72 | E |
| | | 3 | 6.0 | 4.1 | 68 | |
| | | 2 | 4.3 | 2.9 | 75 | |
| | | 1 | 3.2 | 1.8 | 66 | |
| | | Entering Streams | 12.4 | 1.2 | [1] 70 | |
| 6 | 1.03 | 4 | 9.6 | 5.9 | 58 | A |
| | | 3 | 7.3 | 3.7 | 52 | |
| | | 2 | 5.6 | 2.5 | 50 | |
| | | 1 | 4.6 | 1.6 | 40 | |
| | | Entering Streams | 13.2 | 0.9 | [1] 50 | |

See footnote at end of table.

Table 2—Continued

| Run No. | Total Liquid Rate, Gallons per Minute | Stage No. | MEK Concentration Leaving in— Water, wt. percent | MEK Concentration Leaving in— Kerosene, wt. percent | Eff., percent | Mixer Tube Tested |
|---|---|---|---|---|---|---|
| 7 | 0.76 | 4 | 8.5 | 6.0 | 71 | A |
|   |      | 3 | 6.2 | 3.5 | 59 |   |
|   |      | 2 | 4.5 | 2.2 | 61 |   |
|   |      | 1 | 3.4 | 1.3 | 56 |   |
|   |      | Entering Streams. | 12.6 | 0.4 | [1] 62 |   |
| 8 | 0.51 | 4 | 8.8 | 7.0 | 75 | A |
|   |      | 3 | 6.4 | 4.0 | 65 |   |
|   |      | 2 | 4.6 | 2.5 | 62 |   |
|   |      | 1 | 3.2 | 1.6 | 70 |   |
|   |      | Entering Streams. | 13.1 | 0.6 | [1] 68 |   |
| 9 | 1.03 | 4 | 7.2 | 4.7 | 68 | C |
|   |      | 3 | 5.5 | 2.7 | 54 |   |
|   |      | 2 | 4.2 | 1.6 | 49 |   |
|   |      | 1 | 3.0 | 1.0 | 56 |   |
|   |      | Entering Streams. | 10.5 | 0.3 | [1] 57 |   |
| 10 | 1.03 | 4 | 7.2 | 4.7 | 68 | C |
|    |      | 3 | 5.5 | 2.7 | 54 |   |
|    |      | 2 | 4.1 | 1.9 | 57 |   |
|    |      | 1 | 3.1 | 1.2 | 58 |   |
|    |      | Entering Streams. | 10.5 | 0.5 | [1] 59 |   |

[1] Overall efficiency.

EXAMPLE 3

To further show the efficiency of these mixing tubes several runs were made on the four-stage unit with the same test system, but in these tests the methylethyl ketone was extracted from the kerosene by water. In other words, water is the solvent instead of kerosene. Actually, the only difference is that if water is the solvent the entering stream of kerosene contains the ketone, while the water contains essentially none. If kerosene is the solvent, then the water contains the higher concentration of ketone. Mixer tubes A and C were utilized in these tests. The results are given in Table 3.

Table 3.—*Contacting Efficiency Data for Four-Stage Unit While Extracting Methylethyl Ketone From Kerosene With Water*

[Temperature of runs=77° F.; volume ratio, kerosene to water=2:1; gas rate (cu. ft./min.)=0.5]

| Run No. | Total Liquid Rate, Gallons per Minute | Stage No. | MEK Concentration Leaving in— Kerosene, wt. percent | MEK Concentration Leaving in— Water, wt. percent | Eff., percent | Mixer Tube |
|---|---|---|---|---|---|---|
| 1 | 0.51 | 4 | 5.6 | 4.2 | 82 | A |
|   |      | 3 | 8.2 | 7.0 | 90 |   |
|   |      | 2 | 10.0 | 8.4 | 93 |   |
|   |      | 1 | 10.7 | 9.1 | 100 |   |
|   |      | Entering Streams. | 11.2 | 0.0 | [1] 91 |   |
| 2 | 0.51 | 4 | 6.2 | 5.2 | 88 | A |
|   |      | 3 | 10.1 | 8.4 | 89 |   |
|   |      | 2 | 11.8 | 9.6 | 86 |   |
|   |      | 1 | 12.9 | 10.6 | 100 |   |
|   |      | Entering Streams. | 13.4 | 0.0 | [1] 91 |   |
| 3 | 1.03 | 4 | 5.6 | 3.5 | 69 | C |
|   |      | 3 | 7.4 | 5.6 | 70 |   |
|   |      | 2 | 8.9 | 7.2 | 79 |   |
|   |      | 1 | 9.7 | 8.2 | 90 |   |
|   |      | Entering Streams. | 10.5 | 0.0 | [1] 77 |   |
| 4 | 1.03 | 4 | 5.6 | 3.6 | 71 | C |
|   |      | 3 | 7.7 | 6.0 | 74 |   |
|   |      | 2 | 8.9 | 7.5 | 86 |   |
|   |      | 1 | 9.7 | 8.3 | 96 |   |
|   |      | Entering Streams. | 10.2 | 0.0 | [1] 82 |   |

[1] Overall efficiency.

The above examples only serve to describe specific embodiments of the invention and should not be construed as defining its limits.

What is claimed is:

1. A process for contacting a liquid with another liquid incompletely miscible therewith which comprises: flowing one liquid downwardly and the other liquid upwardly through a plurality of stages, each of said stages having a mixing zone and a gas-liquid interface settling zone; effecting intimate cocurrent contact of a gas and said liquids through each of said stages by means of said gas in substantially vertically aligned portions of each of said mixing zones; flowing said liquids and gas cocurrently in a horizontally aligned gas-liquid interface settling zone in each stage, thereby permitting the formation of two essentially distinct liquid phases and a gas phase in each stage; separating said liquids; passing said downwardly flowing liquid to a second mixing zone in a stage at least two stages beneath; passing said upwardly flowing liquid to a third mixing zone in the next above stage; passing to said third mixing zone downwardly flowing liquid from at least two stages above; and effecting cocurrent upward flow of said liquids and gas through said substantially vertically aligned portions of said third mixing zone.

2. A process for contacting a relatively heavy liquid phase with a relatively light liquid phase incompletely miscible therewith which comprises: flowing said heavy liquid phase downwardly and said light liquid phase upwardly through a plurality of stages, each stage having a vertically disposed mixing zone and a horizontally disposed gas-liquid interface settling zone; effecting intimate contact of said liquids in a mixing zone by means of a gas phase; cocurrently flowing said intimately contacted liquids and said gas phase to a gas-liquid interface settling zone, thereby forming essentially distinct heavy and light liquid and gaseous phases; withdrawing said heavy liquid phase to a position at least two stages beneath; withdrawing said light liquid phase and said gaseous phase cocurrently to a second mixing zone in the next above stage; passing to said second mixing zone a heavy liquid phase from at least two stages above; cocurrently upwardly flowing said heavy and light liquid and gaseous phases through said second mixing zone by means of said gaseous phase; and, after a plurality of mixing and separating operations, removing said light and heavy liquid and gaseous phases from selected stages.

3. A liquid-liquid extraction apparatus comprising in combination:
 (1) A plurality of vertically aligned vessels each vessel being characterized by:
  (a) Upper and lower portions
  (b) A wall portion joining said upper and lower portions wherein each of said vessels contains:
   (1) a contacting section defined by a weir connected to said wall portion and said lower portion of said vessel,
   (2) A settling section comprising the balance of said lower portion,
   (3) A lower portion of a first vertically aligned mixing means, said lower portion of said first vertically aligned mixing means being terminated within said contacting section and
   (4) An upper portion of a second vertically aligned mixing means, said upper portion being terminated within said settling section;
 (2) A plurality of downcomer means, each openly connecting said settling section of one vessel to the contacting section of a vessel at least two vessels beneath;
 (3) Means for introducing relatively light liquid and a gas into the bottommost vessel;
 (4) Means for introducing a relatively heavy liquid into the next-to-topmost vessel;

(5) Means for removing said relatively light liquid and said gas from the contacting section of the topmost vessel and (6) Means for removing said relatively heavy liquid from the settling section in the next-to-bottommost vessel.

4. The apparatus of claim 3 which also has gas recycling means.

5. The apparatus of claim 3 wherein said mixing tube is substantially clear of obstructions.

6. The apparatus of claim 3 wherein said mixing tube is at least partially obstructed with packing.

7. The apparatus of claim 3 wherein said settling tray has relatively large cross sectional area and shallow liquid depths.

8. The apparatus of claim 3 wherein each of said vessels except the bottommost contains baffle means connected to the lower portions of said vessels and so constructed and arranged to permit effluent from said mixing means to settle into distinct phases.

9. The apparatus of claim 3 wherein said vessels are substantially cylindrical.

10. The apparatus of claim 3 where said settling section has a baffle means located intermediate said lower portion of said first mixing means and said upper portion of said second mixing means.

11. The apparatus of claim 10 wherein said baffle means has an upper end, a lower end, an inner end, and an outer end, and wherein said outer end is attached to said wall portion of said vessel and said lower end is attached to said lower portion of said vessel.

12. A liquid-liquid extraction apparatus comprising in combination:
(1) A vessel having an intermediate plate forming an upper chamber and a lower chamber within said vessel;
(2) A contacting section within said lower chamber, defined by a weir;
(3) A phase separating section within said upper chamber, said section being defined by a weir;
(4) A vertically aligned mixing means having an upper end and lower end said lower end terminating in said contacting section and said upper end terminating in said phase separating section;
(5) Means for introducing a relatively heavy liquid into said contacting section;
(6) Means for introducing a relatively light liquid and a gas into said lower chamber;
(7) Means for removing said relatively light liquid and gas from said upper chamber;
(8) Means for removing said heavy liquid from said upper chamber.

13. A liquid-liquid extraction apparatus comprising in combination:
(1) A vessel having
 (a) Upper, lower, and intermediate portions,
 (b) A wall portion joining said foregoing portions,
 (c) Said wall portion, lower portion and intermediate portion defining a lower chamber,
 (d) Said wall portion, upper portion and intermediate portion defining an upper chamber;
(2) A contacting section within said lower chamber, defined by a weir attached to said lower portion and said wall portion;
(3) A phase separating section within said upper chamber, said section being defined by a weir attached to said intermediate portion and said wall portion;
(4) A vertically aligned mixing means having an upper end and lower end said lower end terminating in said contacting section and said upper end terminating in said phase separating section;
(5) Means for introducing a relatively heavy liquid into said contacting section;
(6) Means for introducing a relatively light liquid and a gas into said lower chamber;
(7) Means for removing said relatively light liquid and gas from said upper chamber and
(8) Means for removing said heavy liquid from said upper chamber.

14. An apparatus according to claim 13 wherein said vertically aligned mixing means is a tube.

15. An apparatus according to claim 13 wherein said vessel is substantially cylindrical.

16. An apparatus according to claim 14 wherein said mixing tube contains packing.

References Cited in the file of this patent

UNITED STATES PATENTS

| | | |
|---|---|---|
| 1,951,787 | Child et al. | Mar. 20, 1934 |
| 2,520,391 | Findlay | Aug. 29, 1950 |
| 2,564,970 | Hanson | Aug. 21, 1951 |
| 2,580,010 | Fenske et al. | Dec. 25, 1951 |
| 2,746,728 | Pomerleau | May 22, 1956 |
| 2,747,844 | Slayter | May 29, 1956 |
| 2,767,068 | Maycock et al. | Oct. 16, 1956 |
| 2,838,383 | Wistrich | June 10, 1958 |